US005211206A

United States Patent [19]

LaBonte et al.

[11] Patent Number: 5,211,206

[45] Date of Patent: May 18, 1993

[54] APPARATUS FOR SECURING WRITTEN INFORMATION TO TUBULAR GOODS

[75] Inventors: Raymond LaBonte, St. Albert; Marvin Rains, Ardrossan, both of Canada

[73] Assignee: Cougar Tools Inc., Canada

[21] Appl. No.: 647,692

[22] Filed: Jan. 28, 1991

Related U.S. Application Data

[63] Continuation of Ser. No. 450,428, Dec. 14, 1989, abandoned.

[30] Foreign Application Priority Data

Jul. 7, 1989 [CA] Canada .................................. 605137

[51] Int. Cl.[5] ............................................ F16L 55/24

[52] U.S. Cl. ...................................... 138/89; 220/254; 138/96 T

[58] Field of Search ............... 138/89, 91, 96 T, 96 R; 220/254

[56] References Cited

U.S. PATENT DOCUMENTS

| | | | |
|---|---|---|---|
| 96,871 | 11/1869 | Blanchard | 215/227 |
| 1,424,519 | 8/1922 | Richardson | 220/254 |
| 1,637,656 | 8/1927 | Radcliffe | 220/254 |
| 1,651,023 | 11/1927 | Hanna | 215/227 |
| 2,218,581 | 10/1940 | Levan | 138/89 X |
| 2,269,198 | 1/1942 | Hicks | 138/96 R |
| 2,971,669 | 2/1961 | LeBus, Sr. | 138/96 R X |
| 3,439,826 | 4/1969 | Fresu | 215/227 |
| 3,661,184 | 5/1972 | Lachemmayer | 138/89 |
| 4,114,654 | 9/1978 | Richardson | 138/89 |
| 4,303,101 | 12/1981 | Tholen | 138/96 R X |
| 4,438,783 | 3/1984 | Dreyfuss et al. | 138/89 |
| 4,595,113 | 6/1986 | Fafflok et al. | 220/254 |
| 4,717,120 | 1/1988 | Frenow et al. | 138/89 |

FOREIGN PATENT DOCUMENTS

| | | | |
|---|---|---|---|
| 228136 | 5/1960 | Australia | 138/96 R |
| 63287 | 10/1982 | European Pat. Off. | 138/96 |

*Primary Examiner*—A. J. Heinz
*Assistant Examiner*—Joseph A. Rhoa
*Attorney, Agent, or Firm*—Davis, Bujold & Streck

[57] ABSTRACT

A device for securing written information to tubular goods which have a cavity at one end. The apparatus has of a closure, whereby an end cavity of a tubular good is closed. An elongate container is secured to the closure, such that the container extends into the end cavity when the closure is placed on the end of the tubular good.

13 Claims, 2 Drawing Sheets

APPARATUS FOR SECURING WRITTEN INFORMATION TO TUBULAR GOODS

This is a continuation of copending application Ser. No. 07/450,428 filed on Dec. 14, 1989, now abandoned.

BACKGROUND OF THE INVENTION

A vast variety of tubular goods are used in industry. For example, in the drilling industry there are: drill pipes, drill collars, shock tools, drilling jars, bore casing; to name just a few. Similar examples can be drawn from pipeline construction, plumbing and heating, and other industry sectors.

At the point of manufacture or storage of many types of tubular goods, manufacturing reports and specifications, operating instructions, service reports, catalogues, and other written information is meticulously secured to each individual piece of tubular good. The information is required by the end user. When the tubular goods are moved from the point of manufacture or storage the pertinent information relating to the individual tubular goods is frequently lost or destroyed. A variety of methods have been used in an attempt to keep the vital information with the tubular goods, but to no avail. Packets of written information which are tied, glued, wired or strapped to the tubular goods are generally torn off during transit. Shipping stickers and paint labels are rubbed or worn off. Even if the information is recovered, it is impractical if not impossible to match the information with the tubular goods to which it pertains.

SUMMARY OF THE INVENTION

What is required is an apparatus for securing written information to tubular goods.

According to the present invention there is provided an apparatus for securing written information to tubular goods which have a cavity at one end. The apparatus consists of a closure, whereby an end cavity of a tubular good is closed. An elongate container is secured to the closure, such that the container extends into the end cavity when the closure is placed on the end of the tubular good.

The written information pertaining to tubular goods is secured within the container. The container, in turn, is protected from harm within the end cavity when the closure to which the container is secured is placed on the end of the tubular good.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
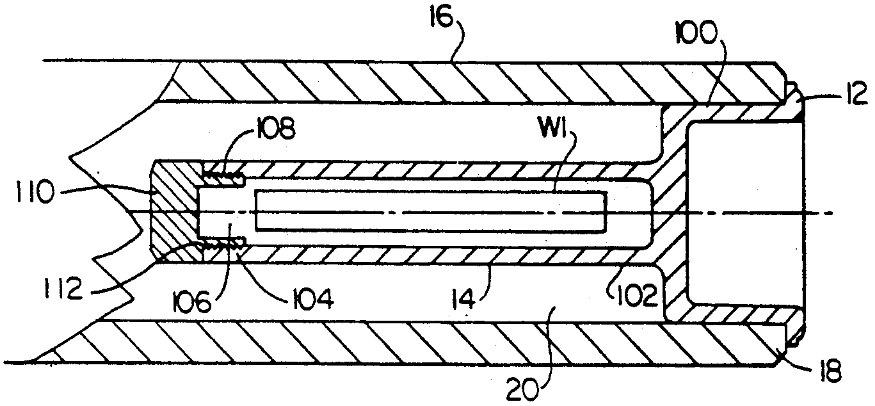
FIG. 1 is a section view of a first preferred embodiment of the invention.

Four alternate embodiments will now be described with reference to FIGS. 1 through 4, to illustrate the variety of ways in which the invention can be put into practice. The alternate preferred embodiments are apparatus for securing written information to tubular goods. The type of tubular goods may vary greatly, however, the invention can only be used with tubular goods which have a cavity at one end. For convenience of reference the alternate embodiments will be generally referred to by reference numerals 100, 200, 300, and 400, respectively. Preferred embodiments 100, 200, 300, and 400 all have some common components. Each embodiment has a closure 12 and an elongate container 14, which is secured in some fashion to closure 12.

A first preferred embodiment 100 is illustrated in FIG. 1. In this embodiment, closure 12 is in the form of a plug. Elongate container 14 has one end 102 secured to closure plug 12 and a remote end 104 having an opening 106 with interior threads 108. A closure lid 110 with exterior threads 112 mates with interior threads 108 in opening 106 to detachably secure container 14 to closure plug 12.

Figure 2:
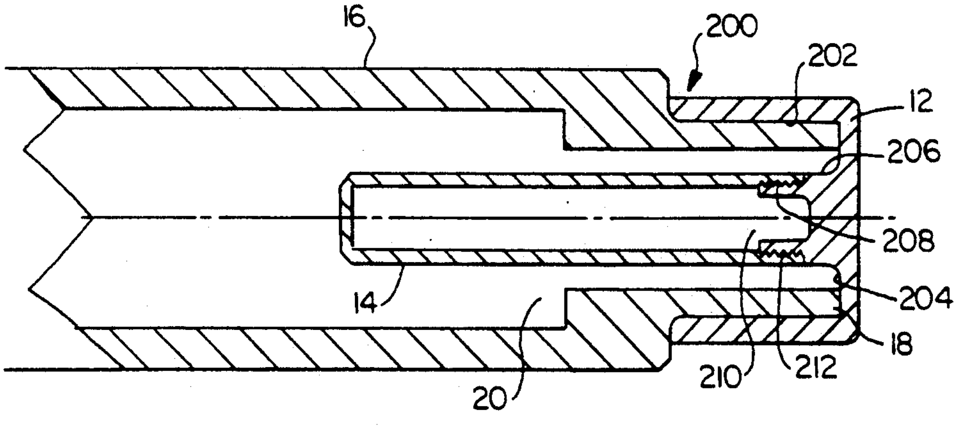
FIG. 2 is a section view of a second preferred embodiment of the invention.

A second preferred embodiment 200 is illustrated in FIG. 2. In this embodiment, closure 12 is in the form of an end cap. Closure cap 12 has interior side walls 202 and an interior end wall 204. Interior end wall 204 has a stub projection 206 with exterior threads 208. Elongate container 14 has an opening 210 which has interior threads 212. Interior threads 212 of opening 210 matingly engage exterior threads 208 of stub 206 to removably secure container 14 to closure cap 12.

Figure 3:
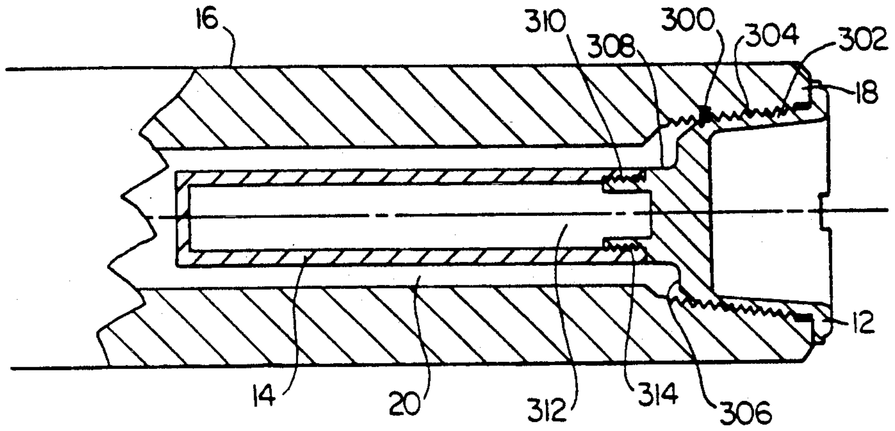
FIG. 3 is a section view of a third preferred embodiment of the invention.

A third preferred embodiment 300 is illustrated in FIG. 3. In this embodiment, closure 12 is in the form of a plug. Closure plug 12 has exterior side walls 302 with threads 304 and an exterior end wall 306. Exterior end wall 306 has a stub projection 308 with exterior threads 310. Elongate container 14 has an opening 312 with interior threads 314. Interior threads 314 of opening 312 matingly engage exterior threads 310 of stub 308 to removably secure container 14 to closure plug 12.

Figure 4:
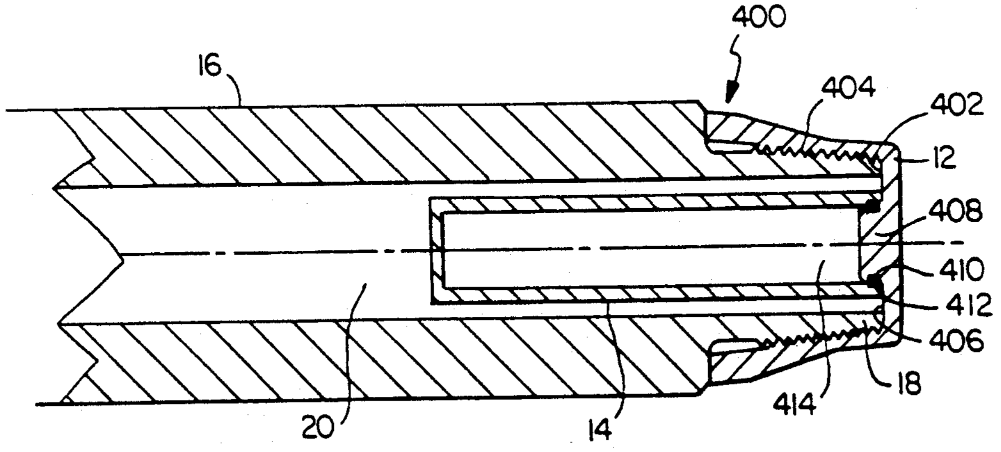
FIG. 4 is a section view of a fourth preferred embodiment of the invention.

A fourth preferred embodiment 400 is illustrated in FIG. 4. In this embodiment, closure 12 is in the form of a cap. Closure cap 12 has interior side walls 402 with threads 404, and an interior end wall 406. Interior end wall 406 has a stub projection 408 with an annular groove 410 in which is positioned an "O" ring seal 412. Elongate container 14 has an opening 414. Opening 414 matingly engages stub 408 and is secured in a friction fit relation by "O" ring seal 412 to removably secure container 14 to closure cap 12.

The use of the embodiments 100, 200, 300, 400 as illustrated in FIGS. 1 through 4 will now be described. For the purposes of the description reference will be made to tubular goods, generally designated by reference numeral 16 having ends 18. Four alternate configurations for end 18 are illustrated in FIGS. 1 through 4. All configurations have an end cavity 20 to which access may be obtained through end 18. FIG. 1 illustrates an end 18 suitable for receiving a plug. FIG. 2 illustrates an end 18 suitable for receiving a cap. FIG. 3 illustrates an end 18 with a threaded box connection. FIG. 4 illustrates an end 18 with a threaded pin connection 24. Written information (not shown) is inserted into container 14. With embodiment 100, container 14 is part of closure plug 12; access is gained to container 14 through opening 106 and then the written instructions are maintained in container 14 by closure lid 110. With embodiment 200, interior threads 212 of opening 210 matingly engage exterior threads 208 of stub 206 to removably secure container 14 to closure cap 12. With embodiment 300, interior threads 314 of opening 312 matingly engage exterior threads 310 of stub 308 to removably secure container 14 to closure plug 12. With embodiment 400, opening 414 matingly engages stub 408 and is secured in a friction fit relation by "O" ring seal 412 to removably secure container 14 to closure cap 12. In all embodiments container 14 extends into end cavity 20 when closure 12 is placed on end 18 of tubular good 16.

It will be apparent to one skilled in the art that embodiments 100, 200, 300, and 400, all provide a safe way for securing written information (not shown) to tubular goods 16. The possibility of container 14 being lost or destroyed is extremely remote, in view of the positioning of container 14 within end cavity 20. It will be apparent to one skilled in the art that modifications are necessarily required to the invention to adapt closure 12 for use with varying configurations of ends 18. This difference is demonstrated in relation to the preferred embodiments illustrated in FIGS. 1 through 4. It will also be apparent that modifications may be made to the preferred embodiment without departing from the spirit and scope of the invention. For example, there are a variety of ways to secure container 14 to closure 12; only three of which have been illustrated.

The embodiments of the invention in which an exclusive property or privilege is claimed are defined as follows:

1. An apparatus for securing written information to a tubular good defining a cavity comprising:

a. a closure having means for engaging and securing the closure to an end of the cavity; and b. an elongate container, being dimensioned to receive the written information, comprising a first portion being connected to the closure and a second portion being repeatedly releasably secured to the first portion to form a completely sealed container when engaged therewith whereby the written information is insertable into and removable from the container only when the second portion is releasably detached from the first portion;

wherein the first portion is connected to the closure such that when the second portion is secured to the first portion and the closure closes the end of the cavity of the tubular good, both portions of the container extend completely within the cavity and are shielded by both the tubular good and the closure whereby access to the first and second portions of the container is prevented; and the integrity of the sealed container is unaffected during insertion and removal of the container from the cavity of the tubular good and the integrity of the sealed container is established separately from the securement of the closure to the end of the cavity.

2. An apparatus according to claim 1, wherein the repeatedly releasably securement of the first portion to the second portion is achieved by mating threads carried by engaging surfaces of the first and the second portions.

3. An apparatus according to claim 2, wherein the first portion carries an interior thread and the second portion carries a mating exterior thread.

4. An apparatus according to claim 1, wherein the repeatedly releasably securement of the second portion to the first portion is achieved solely by interaction of engaging surfaces of the first and the second portions with one another.

5. An apparatus according to claim 1, wherein the container has a diameter significantly smaller than the diameter of the closure to facilitate insertion and removal of the container from the cavity and thereby to ensure sufficient spacing of the entire exterior surfaces of the first and the second portions of the container from the interior surface of the cavity when the container is positioned within the tubular good.

6. An apparatus according to claim 1, wherein the means for engaging and securing the closure is an exterior cylindrical surface of the closure closely engaging a mating interior cylindrical surface of the tubular good.

7. An apparatus, for securing written information to a tubular good having an inner surface and defining a cavity, comprising:

a. a closure having means for engaging and securing the closure to an end of the cavity; and b. an elongate container, being dimensioned to receive the written information, comprising a first portion being connected to the closure and a second portion being repeatedly releasably secured to the first portion to form a completely sealed container when engaged therewith whereby the written information is insertable into and removable from the container only when the second portion is releasably detached from the first portion, wherein the first portion is connected to the closure such that when the second portion is secured to the first portion and the closure closes the end of the cavity of the tubular good, both the first and second portions of the container extend completely within the cavity and are shielded by both the tubular good and the closure whereby access to either of the first and second portions of the container is prevented, and one of the first and second portions is an elongate cylindrical member partially defining the container and having an exterior surface sufficiently spaced from the interior surface of the tubular good, when positioned in the tubular good, to facilitate unrestricted insertion and removal of the container from the cavity; and the integrity of the sealed container is unaffected during insertion and removal of the container from the cavity of the tubular good and the integrity of the sealed container is established separately from the securement of the closure to the end of the cavity.

8. An apparatus, for securing written information to a tubular good having an inner surface and defining a cavity, comprising:

a. a closure having means for engaging and securing the closure to an end opening of the cavity; and b. an elongate container, being dimensioned to receive the written information, comprising a first portion being connected to the closure and a second portion being repeatedly releasably secured to the first portion to form a completely sealed container when engaged therewith, completely encompassing the written information whereby the written information is insertable into and removable from the container only when the second portion is releasably detached from the first portion, wherein the first portion is connected to the closure such that when the second portion is secured to the first portion and the closure closes the end opening of the cavity, both the first and second portions of the container extend away from the end opening into the cavity and are completely housed therein, with the second portion located within the cavity at a position remote from the end opening, both the first and second portions are shielded by both the tubular good and the closure whereby access to either of the first and second portions of the container is prevented, and one of the first and second portions is an elongate cylindrical member partially defining the container and having an exterior surface sufficiently spaced from the interior surface of the tubular good, when positioned in the cavity of the tubular good, to facilitate unrestricted insertion and removal of the container from the cavity; and the integrity of the sealed container is unaffected during insertion and removal of the container from the cavity of the tubular good and the integrity of the sealed container is established separately from the securement of the closure to the end of the cavity.

9. An apparatus according to claim 2, wherein the first portion carries an exterior thread and the second portion carries a mating interior thread.

10. An apparatus according to claim 1, wherein the repeatedly releasably securement of the second portion to the first portion is achieved by an O-ring positioned between engaging surfaces of the first and the second portions.

11. An apparatus according to claim 10, wherein the O-ring is supported in a groove formed in the first portion.

12. An apparatus according to claim 1, wherein the means for engaging and securing the closure is a surface of the closure provided with an exterior thread for engaging an interior thread carried by the tubular good.

13. An apparatus according to claim 1, wherein the means for engaging and securing the closure is a surface of the closure provided with an interior thread for engaging an exterior thread carried by the tubular good.

* * * * *